United States Patent Office 3,719,714
Patented Mar. 6, 1973

3,719,714
AROMATIC SULPHONES AND POLYMERS PRODUCED THEREFROM
Victor Jeffrey Leslie, Potters Bar, and John Brewster Rose, Letchworth, England, assignors to Imperial Chemical Industries Limited, London, England
No Drawing. Filed May 21, 1971, Ser. No. 145,895
Claims priority, application Great Britain, June 3, 1970, 26,837/70
Int. Cl. C07c *147/06*
U.S. Cl. 260—607 A                    3 Claims

ABSTRACT OF THE DISCLOSURE

Novel compounds of the formula

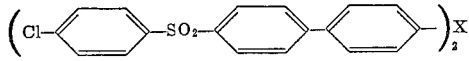

in which X may be —$SO_2$—, —$SO_2$—Ar—$SO_2$, —SO—, —CO— or —CO—Ar—CO, are valuable starting materials for preparing polysulphones containing biphenyl residues in the polymer chain.

---

The present invention relates to aromatic sulphones useful as starting materials for the production of aromatic polymers and to polymers produced therefrom.

In the specifications of British Patents 1,078,234 and 1,153,035 there are described processes for preparing poly-arylsulphones in which bis-(4-chlorophenyl) sulphone is used as starting material. In specification 1,153,528 is described how certain other aromatic compounds having terminal 4-chlorophenyl sulphonyl groups linked by aromatic residues may be used to form valuable polymers. Hence in these specifications, processes are described in which aromatic polymeric material is prepared by nucleophilic polycondensation of bifuctional aromatic compounds with reactive bifunctional comonomers.

According to the present invention in one aspect there are provided, as valuable starting materials for preparing polysulphones containing biphenyl residues in the polymer chain, novel compounds of the Formula I

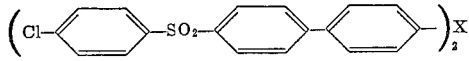 (I)

in which X may be —$SO_2$, —$SO_2$—Ar—$SO_2$—, —SO—, —CO— or —CO—Ar—CO—, in which Ar represents a benzene, biphenyl or naphthalene residue. X may, for example, have one of the following formulae:

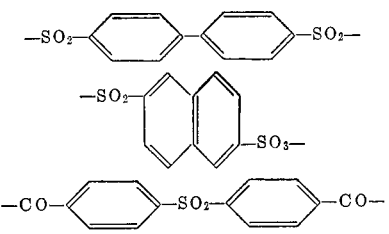

The compounds of the present invention are valuable as intermediates in the production of polyarylene ethers or thioethers by the processes described in the above-mentioned patent specifications or that described in British patent specification No. 1,124,200, which is also incorporated herein by reference.

The compounds of Formula I can be hydrolysed by bases to form the corresponding bisphenols or their salts and these compounds are valuable as starting materials for the preparation of polyesters, polyethers and polycarbonates in well known manner.

According to the present invention in another aspect therefore there are provided, as further valuable starting materials for the production of polymers, compounds of the Formula I but in which both chlorine atoms are replaced by hydroxy groups, or salts thereof.

The compound bis - [4'-(4'-chlorophenylsulphonyl)biphenylyl]sulphone represented by the Formula II

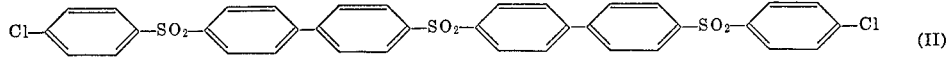 (II)

is a particularly valuable starting material for preparing polymers by the processes according to the patent specifications above mentioned; particularly if it is used in conjunction with other dihalides such as bis-(4-chlorophenyl) sulphone or 4,4' - di-(4-chlorophenylsulphonyl)biphenyl for the preparation of copolymers.

By the compounds of the present invention, polymers may be produced which have a greater proportion of aromatic units in the chain than has been possible according to the disclosures in the prior art above referred to, with the advantage that the polymers have among other valuable properties, higher Tg's. The Tg, the glass transition temperature (also commonly referred to as the second order transistion temperature), is convenienty measured as the temperature at which there is an inflexion in the trace obtained in a differential scanning calorimeter when the polymer is heated at a predetermined rate, usually 16° C. per minute. While an increase in biphenyl units is thought likely to give rise to polymers having desirably higher Tg's, the starting materials for polymerisation hitherto available have placed a limit on what can be achieved in this direction.

An essential intermediate in the preparation of the compounds of the present invention is the novel compound 4-(4-chlorophenylsulphonyl)biphenyl of Formula III

 (III)

The compound may be prepared by a Friedel-Crafts reaction starting from biphenyl which is reacted in nitrobenzene as solvent with 4-chlorobenzenesulphonyl chloride in the presence of anhydrous ferric chloride as catalyst, or it may be prepared from 4-chlorobenzenesulphonic acid and biphenyl in the presence of a pentavalent phosphorus halide or methyl pyrosulphate in a manner analogous to that described in United States specification 3,125,604 or British specification 895,464.

The compounds of Formula I can be prepared from the compound of Formula III by a variety of methods, all in general well known in the art for preparing analogous compounds. Generally a bifunctional derivative of the group X carrying groups capable of reacting with the 4'-H of the biphenyl group of the compound of Formula III is used, and such a derivative is reacted with two mols of the compound of Formula III. This is most conveniently so where X is a biphenyl-4,4'-disulphonyl group, a naphthalene-2,6-disulphonyl group, or the group —CO—Ar—CO— as defined above, and the dichlorides thereof are conveniently the bifunctional derivatives thereof. In the case where X is —$SO_2$—, —SO— and —CO—, though the corresponding dichlorides can be reacted directly with the compound of Formula III, it will usually be more convenient to form first a derivative (IV)

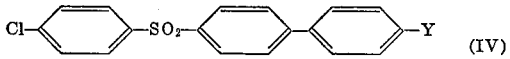
(IV)

where Y is a group capable of forming the group —X— with the 4'-H of the biphenyl group of compound of Formula III, for example an —$SO_2Cl$, —SOCl or —COCl group. Such a two stage procedure may be used for any of the various groupings defined for X in analogous manner.

For instance, the compound of Formula II may be synthesised according to the following reaction scheme;

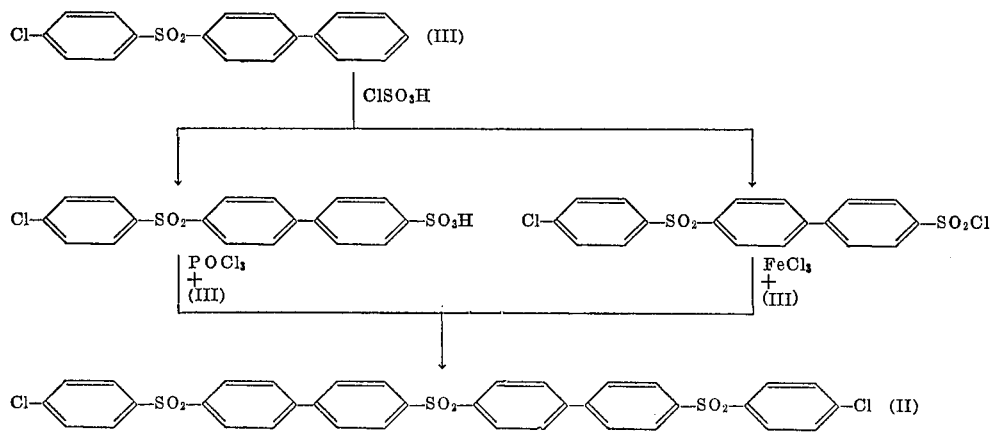

The invention in yet another aspect provides a homo- or copolymerisation reaction in which there is used as a reactant a compound of Formula I or a compound in which both of the chlorine atoms of Formula I are replaced by a hydroxy group. The compound of Formula I undergoes polymerisation reactions under the same conditions which are already known for carrying out polymerisation reactions with other bis(4-chlorophenyl) sulphones, as described for example in the British patent specifications referred to above.

The following examples illustrate the invention.

EXAMPLE I

A mixture of biphenyl (308 g.; 2.0 mole) and 4-chlorobenzenesulphonyl chloride (422 g.; 2.0 mole) was dissolved in redistilled nitrobenzene (500 cm.³) and the solution was stirred under an atmosphere of nitrogen and heated to 110° C. Anhydrous ferric chloride (4 g.) was added and stirring was continued, while the mixture was kept at 110° C., until the evolution of hydrogen chloride subsided. The dark-coloured solution was then poured into methanol (2 liters) and the precipitate was filtered off, washed twice with a solution of acetylacetone (5 cm.³) in methanol (500 cm.³), and after a final wash with methanol was air-dried. The yield was 524 g. (80%) of a product of M.P. 167–169° C. Recrystallisation from acetic acid (with charcoal) gave pure white needles of 4-(4-chlorophenylsulphonyl)biphenyl, M.P. 171–173° C. The elemental analysis and the infra-red and nuclear magnetic resonance spectra of this product were consistent with this structure

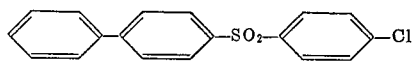

4-(4-chlorophenylsulphonyl)biphenyl prepared as described above (98.7 g.; 0.3 mole) was dissolved in nitrobenzene (90 cm.³) and the solution was warmed to 70° C. Chlorosulphonic acid (17.5 g.; 0.15 mole) was added drop-wise over a period of 30 minutes. When the evolution of hydrogen chloride subsided (4 hours), phosphorus oxychloride (23.1 g.; 0.15 mole) was added and the stirred mixture was heated to 140° C. and kept at this temperature for 18 hours. Anhydrous ferric chloride (1.8 g.) was then added and the heating continued for a further 4 hours. On pouring the viscous mixture into methanol (500 cm.³) a colourless precipitate formed which was filtered and washed with methanol. Recrystallisation from dimethylsulphoxide afforded bis-[4'-(4-chlorophenylsulphonyl)biphenylyl] sulphone. The yield was 69 g. (64%) of a product of M.P. 340–342° C. The infra-red and nuclear magnetic resonance spectra of this product were consistent with the structure

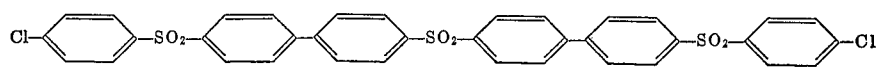

A sample (60 g.; 0.0834 mole) of bis-[4'-(4-chlorophenylsulphonyl)biphenylyl] sulphone, a portion (38.1 cm.³; 0.3753 mole) of a 9.84 normal aqueous solution of potassium hydroxide and dimethyl sulphoxide (250 cm.³) was charged into a stainless steel flanged beaker. The mixture was stirred under an atmosphere of nitrogen and heated to 140° C. After 3 hours, the yellow solution was filtered and acidified with dilute (2 normal) hydrochloric acid. A white precipitate was formed which was filtered, washed free of acid with distilled water, washed with methanol and dried. The product was recrystallised, with difficulty, from isopropanol.

The infra-red spectrum, nuclear magnetic resonance spectrum and elemental analysis of this product were consistent with the structure

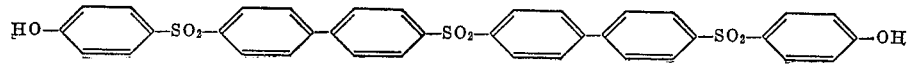

EXAMPLE 2

Bis-[4'-(4-chlorophenylsulphonyl)biphenylyl] sulphone (287.6 g.; 0.4 mole), bis(4-chlorophenyl)sulphone (1033.2 g.; 3.6 mole) and aqueous potassium hydroxide (925.6 g.; 8.0 mole) were suspended in dimethyl sulphoxide (2 litres) in a stainless steel beaker fitted with baffles, a stainless steel stirrer, a thermometer, a reflux condenser and a nitrogen inlet and outlet. The mixture was stirred and heated to 135° C. over a period of 3 hrs., kept at this temperature for 4 hours, and then cooled to room temperature.

A representative sample of this hydrolysis product (111 g.; 0.1 mole) was heated to 100° C. at 20 torr pressure to remove much of the dimethyl sulphoxide. After 30 cm.³ of dimethyl sulphoxide distilled, dimethyl sulphone (100 g.) was added and the distillation continued in order to remove the remainder of the dimethyl sulphoxide. During this interchange some of the dimethyl sulphone sublimed and the distillation was continued until the concentration of solids in the dimethyl sulphone approached 67% w./w. The solution was then polymerised by heating to 220° for 24 hours, to give a thick viscous solution. N,N-dimethylformamide (50 cm.³) was then added and the resulting solution precipitated into water (500 cm.³). The polymer was heated in boiling water for 1 hour, filtered, washed with a further sample of hot water and dried. The polymer obtained had a reduced viscosity of 0.55 in a solution of dimethylformamide at 25° C. containing 1 g. of polymer in 100 cm.³ of solution, and a Tg of 243° C. by differential scanning calorimetry. The polymer could be compression-moulded into a strong transparent amber-coloured plaque.

EXAMPLE 3

4,4'-di-(4-chlorophenylsulphonyl)biphenyl (902.4 g.; 1.79 mole), bis-[4'-(4-chlorophenylsulphonyl)biphenylyl] sulphone (143.8 g.; 0.2 mole) and aqueous potassium hydroxide (46.0 95 g.; 3.998 mole) were placed in a stainless steel vessel fitted with a baffle, reflux condenser, thermometer and a stainless steel stirrer. Dimethyl sulphoxide (1 litre) was added and the contents stirred and heated to 135° C., gradually over a 3 hour period, kept at this temperature for a further 3 hours, and then cooled to room temperature.

A represenative sample of the hydrolysis product (158 g.; 0.1 mole) was heated to 160° C. at 20 torr pressure to remove much of the dimethyl sulphoxide. After 30 cm.³ of dimethyl sulphoxide was distilled, dimethyl sulphone (100 g.) was added and the distillation continued to remove the remainder of the dimethyl sulphoxide. During this interchange some of the dimethyl sulphone sublimed, and the distillation was continued until the concentration of solids in the dimethyl sulphone approached 67% w./w. The mixture was then polymerised by heating to 220° C. for 24 hours to give a thick viscous solution. N,N-dimethylformamide (50 cm.³) was then added and the resulting solution precipitated into water (500 cm.³). The polymer was heated in boiling water for 1 hour, filtered, washed with a further sample of hot water and dried. The polymer thus obtained had a reduced viscosity of 0.37 in a solution in dimethylformamide containing 1 g. of polymer in 100 cm.³ of solution, and a Tg in excess of 280° C. The polymer could be compression-moulded into a rigid transparent amber-coloured film.

We claim:

1. A compound of the formula

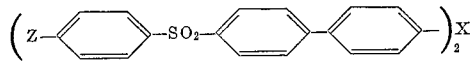

in which X is —SO$_2$—, SO$_2$ArSO$_2$— or —SO—, where Ar represents a bivalent aromatic residue derived from benzene, biphenyl or naphthalene and Z is a chlorine atom or hydroxyl group or a salt thereof.

2. A compound according to claim 1 having the formula

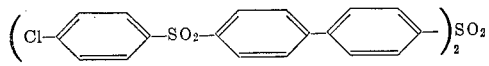

3. A compound according to claim 1 wherein X is —SO$_2$—.

References Cited

FOREIGN PATENTS

| | | | |
|---|---|---|---|
| 1,153,528 | 5/1969 | Great Britain | 260—607 A |
| 1,078,234 | 8/1968 | Great Britain | 260—607 A |

LEWIS GOTTS, Primary Examiner

D. R. PHILLIPS, Assistant Examiner

U.S. Cl. X.R.

260—79.3 M